No. 770,466. PATENTED SEPT. 20, 1904.
A. G. HUPFEL.
GANG PUNCHING MACHINE.
APPLICATION FILED APR. 9, 1904.
NO MODEL. 9 SHEETS—SHEET 3.

Witnesses:
Arthur Gumpe
F. Unfricht

Inventor
Adolph G. Hupfel
by Hauff & Friesen Atty.

No. 770,466. PATENTED SEPT. 20, 1904.
A. G. HUPFEL.
GANG PUNCHING MACHINE.
APPLICATION FILED APR. 9, 1904.
NO MODEL. 9 SHEETS—SHEET 7.

No. 770,466. PATENTED SEPT. 20, 1904.
A. G. HUPFEL.
GANG PUNCHING MACHINE.
APPLICATION FILED APR. 9, 1904.
NO MODEL. 9 SHEETS—SHEET 8.

Witnesses:
Inventor:
Adolph G. Hupfel

No. 770,466. PATENTED SEPT. 20, 1904.
A. G. HUPFEL.
GANG PUNCHING MACHINE.
APPLICATION FILED APR. 9, 1904.
NO MODEL. 9 SHEETS—SHEET 9.

Witnesses:
Arthur Jumper
F. Unfracht

Inventor
Adolph G. Hupfel
by Frank v. Briesen Atty.

No. 770,466. Patented September 20, 1904.

UNITED STATES PATENT OFFICE.

ADOLPH G. HUPFEL, OF NEW YORK, N. Y., ASSIGNOR OF ONE-HALF TO CHARLES ROOS, OF NEW YORK, N. Y.

GANG PUNCHING-MACHINE.

SPECIFICATION forming part of Letters Patent No. 770,466, dated September 20, 1904.

Application filed April 9, 1904. Serial No. 202,325. (No model.)

*To all whom it may concern:*

Be it known that I, ADOLPH G. HUPFEL, a citizen of the United States, residing at New York city, (Manhattan,) county and State of New York, have invented new and useful Improvements in Gang Punching-Machines, of which the following is a specification.

This invention relates to a machine for perforating metal plates such as are used for strainers, filters, false bottoms for mash-tubs, hop-jacks, &c.

By my invention conical perforations are punched complete by a single operation in parallel rows, the perforations in any one row being staggered with those of the adjoining rows.

With foraminated bottoms for mash-tubs, strainers, and similar devices more particularly adapted for brewers' use it is of importance that the perforations be accurately placed and that they are arranged closely together, so as to obtain a rapid filtration and to increase the percentage of the extracts. This desirable result is accomplished by my invention in a quick and efficient manner and without the use of skilled labor.

Briefly stated, the machine comprises a bed-plate to which the work-piece is adapted to be clamped and which is fed underneath the punches in a zigzag direction, so that the holes are punched to break line. The punches are suspended within a perforated punch-holder attached to a reciprocating plunger. They are provided with lower teats, which will first perforate the metal, and with upper coniform tips, which will expand the perforations into the tapering openings desired. In this way a tapered hole open from end to end is punched complete by a single descent of the plunger. In order to permit an imperforate rim to be formed around the work-piece, means are provided for throwing the end punches successively out of action.

The machine is illustrated in the accompanying drawings, in which—

The numeral 25 represents the frame of the machine, provided with a standard 26, in which is journaled the power-shaft 27. This shaft is adapted to impart vertical reciprocating movement to a head or plunger 28, that extends across frame 25 and is guided in grooves 29 of standard 26. The plunger 28 carries the punches 30 and will be described more in detail farther below.

Figure 1:
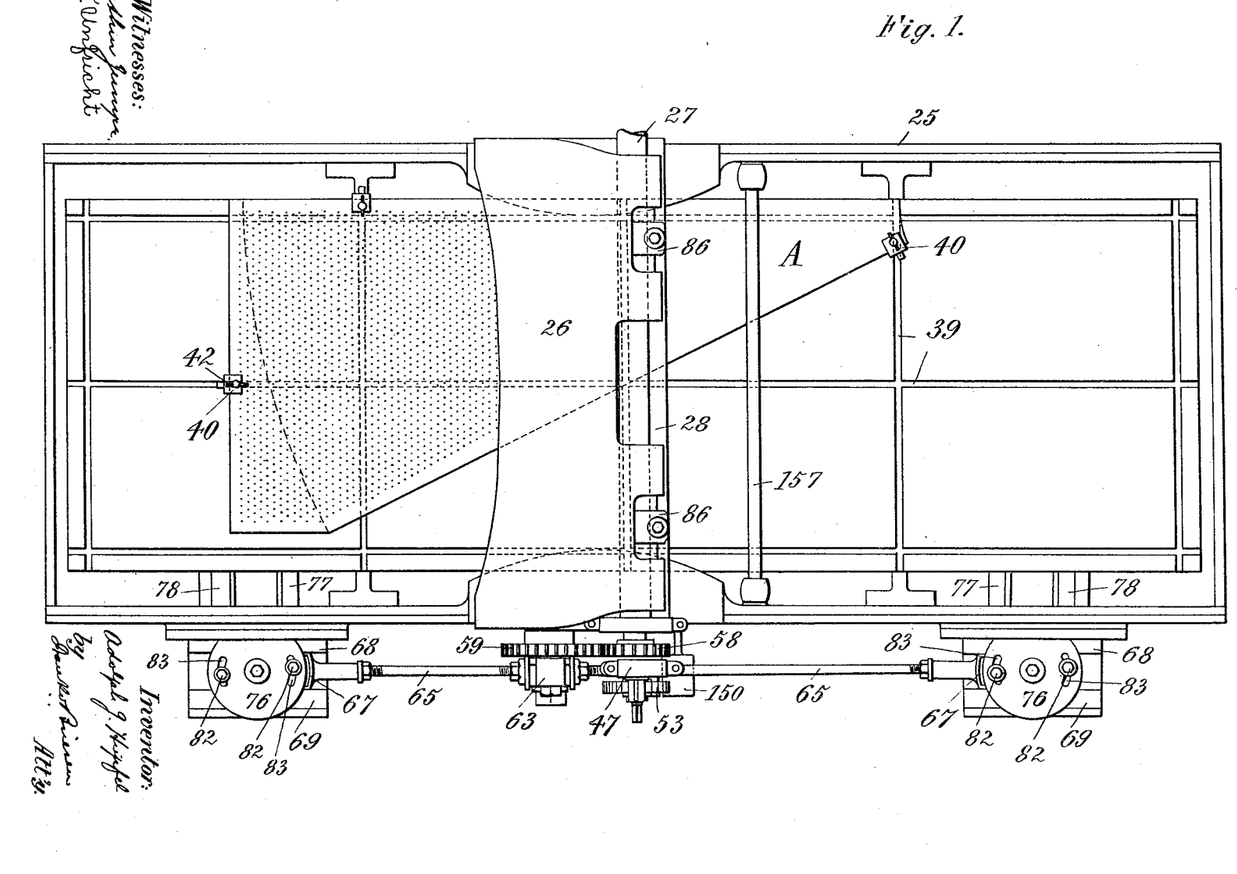
Figure 1 is a plan, partly broken away, of a gang punching-machine embodying my invention.
Figure 2:
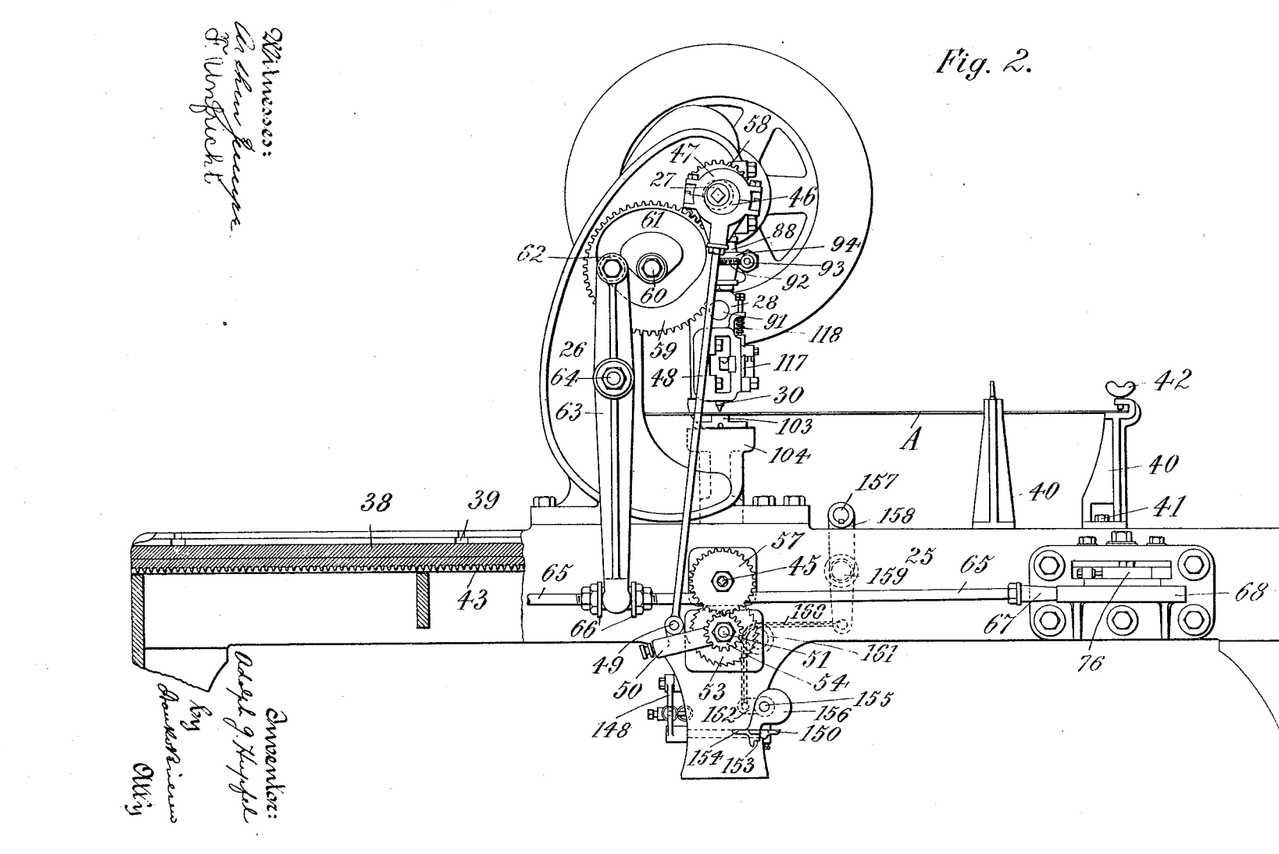
Fig. 2, a side elevation, partly in section, thereof.
Figure 3:
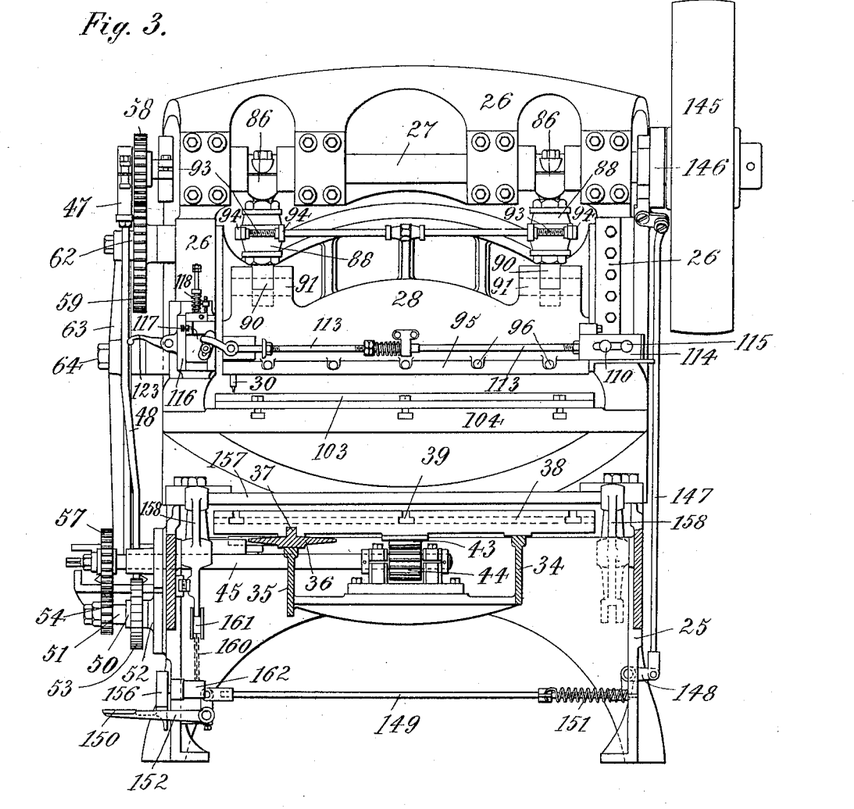
Fig. 3, a right-hand end view thereof, partly in section and with some of the parts omitted.
Figure 4:
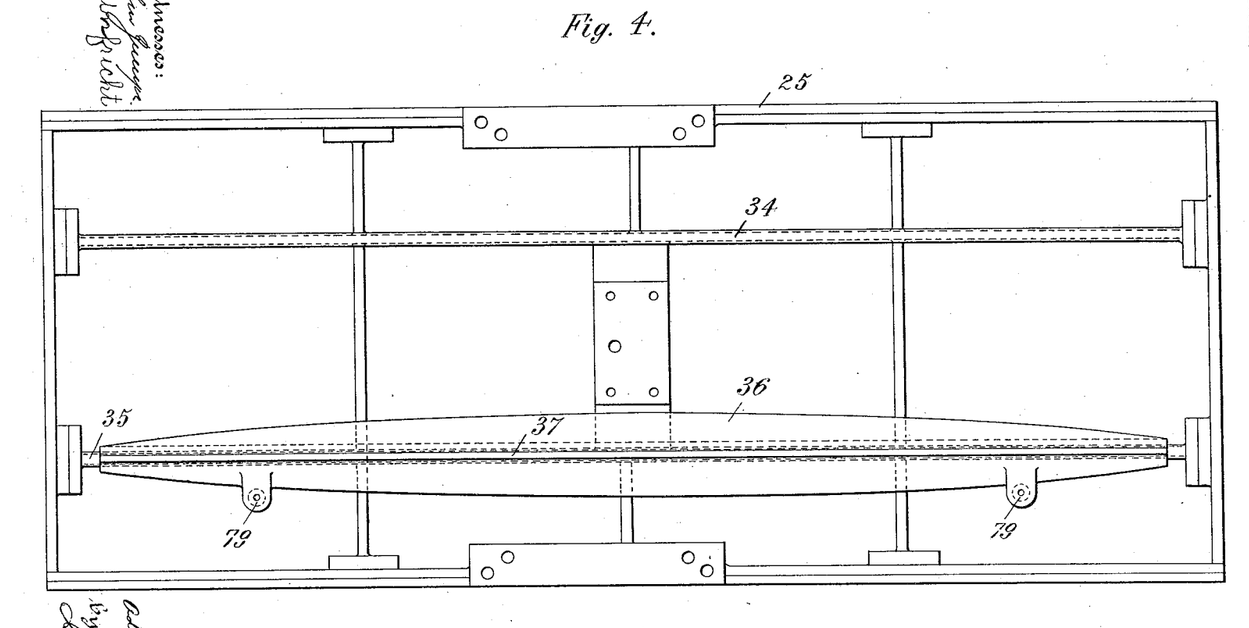
Fig. 4, a plan of the lower part of the frame, showing the shifting beam in position.

The copper plate or other work-piece A to be punched is so supported that it receives an intermittent zigzag movement. In this way the gang of punches will form successive rows of perforations in which the perforations of any one row break line with those of the adjoining rows. Thus the gang of punches first forms the row of perforations 31, Fig. 20, then the row 32, then the row 33, &c. It will be observed that the first perforation of row 31 is in advance of first perforation in row 32, which in turn is placed back of first perforation in row 33, &c. Consequently as the first perforation of each row is always made by the first punch of the gang, the second perforation by the second punch, &c., it is necessary that the work-plate A receive the zigzag motion hereinabove referred to. The means for obtaining this result are as follows: The frame 25 is provided with two longitudinal rails 34 35, of which the rail 34 is somewhat higher than the rail 35, Fig. 3. Upon the rail 35 is supported a laterally-movable slide or shifting beam 36, Figs. 3 and 4, having an upwardly-extending longitudinal rib 37. This rib engages a corresponding groove of a bed-plate 38, which is also supported directly upon rail 34, the parts 37 34 thus forming a track for the bed-plate. The upper side of plate 38 is provided with a number of undercut surface-grooves or T-slots 39, Figs. 1, 3, and 4, adapted for the reception of the lower ends of adjustable supports 40, which may be locked in position by clamp-screws 41. The upper ends of supports 40 are grooved to form rests for the work-piece A, which is clamped in position by screws 42. The lower side of plate 38 is provided with a central longitudinal rack 43, operatively engaged by a pinion 44, fast on the transverse shaft 45.

Figure 17:
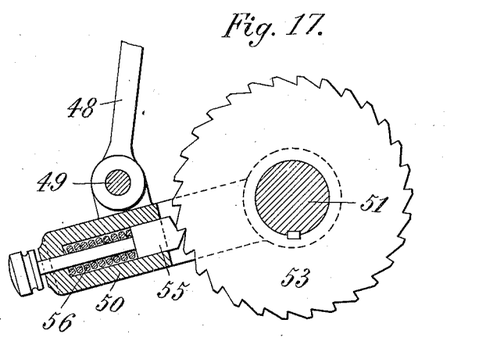
Fig. 17, a detail of the pawl-and-ratchet mechanism for imparting longitudinal motion to the bed-plate.
Figure 18:
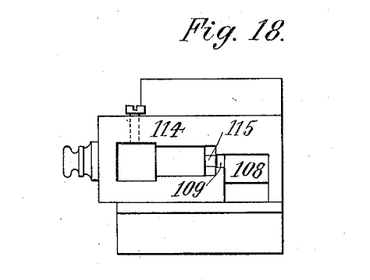
Fig. 18, an end view of the rear slide-guide.

Intermittent rotary movement is imparted to the pinion, so as to impart a corresponding intermittent longitudinal movement to plate 38, along rail 34, and beam 36, in the following manner: The power-shaft 27 carries an eccentric 46, engaged by a strap 47, having connecting-rod 48. This rod is pivoted at 49 to a tubular guide 50, turning on arbor 51, which is journaled in bearing 52 of frame 25. Upon the arbor 51 is keyed a ratchet-wheel 53 and a pinion 54. The ratchet-wheel 53, Fig. 17, is engaged by a pawl 55, influenced by a spring 56 and slidable within tubular guide 50. The pinion 54 meshes into a gear-wheel 57, mounted upon shaft 45 of pinion 44. It will be seen that by the mechanism described the power-shaft 27 will impart an oscillating movement to the pawl 55, which in turn imparts an intermittent rotary movement to ratchet-wheel 53. This movement is transmitted by gear-wheels 54 57 to pinion 44, while the latter in turn through rack 43 imparts the desired intermittent longitudinal movement to bed-plate 38. In addition to the intermittent longitudinal movement described the plate 38 also receives an intermittent lateral movement alternating in direction. The joint effect of the forces thus operating upon the bed-plate is to impart to it the desired zigzag movement hereinabove referred to.

Upon shaft 27 is mounted a gear-wheel 58, which engages the toothed periphery of a cam-wheel 59, turning on stud 60. The wheel 59 has a cam-groove 61, engaged by a roller 62 of an oscillating cam-lever 63, turning on fulcrum 64. The lower end of lever 63 engages a rod 65 by means of collars 66, so that intermittent reciprocating movement is imparted to the rod. Each end of rod 65 is tapped into a longitudinal slide 67, movable in a grooved guide 68 of frame 25. In order to compensate for wear, each guide 68 is provided with a grooved adjustable rail 69, which engages one side of slide 67. The slide 67 is provided with a central stud 70, which enters a corresponding perforation of a disk 71, having a longitudinal groove 72. The disk 71 may be adjustably secured to slide 67, so that the groove 72 assumes any desired inclination to the direction of movement of the slide. The means for securing the disk to the slide consist of bolts 73, passing through curved slots 74 of slide 67 and engaging tapped perforations of disk 71.

Figures 5, 8:
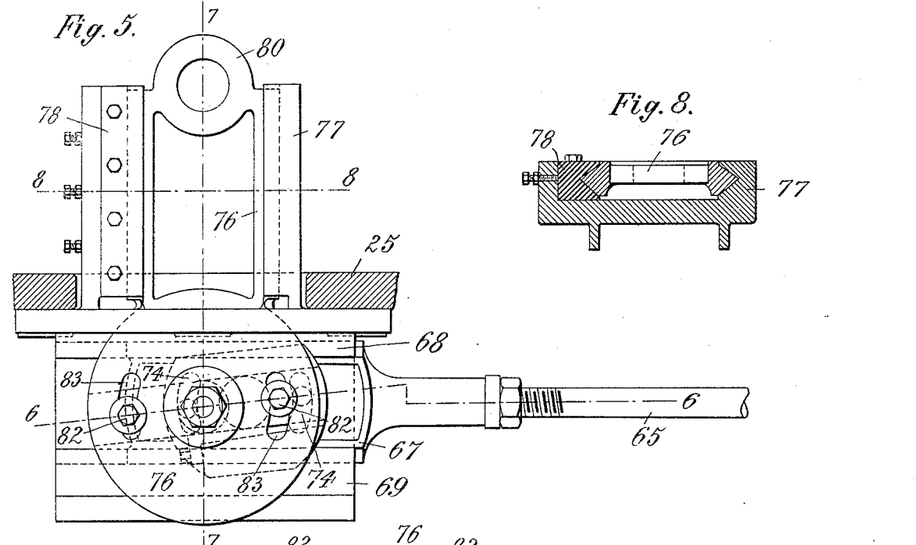
Fig. 5, a detail plan of the mechanism for imparting the lateral movement to the bed-plate.
Fig. 8, a cross-section on line 8 8, Fig. 5.
Figures 6, 7, 9:
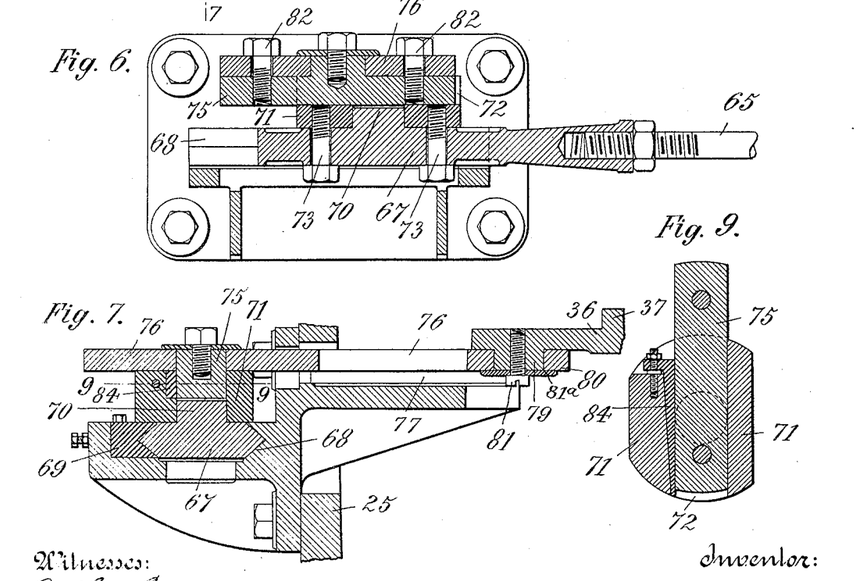
Fig. 6, a vertical longitudinal section on line 6 6, Fig. 5.
Fig. 7, a vertical transverse section of line 7 7, Fig. 5, showing part of the shifting beam.
Fig. 9, a horizontal section on line 9 9, Fig. 7.

The groove 72 of disk 71 receives a rail 75, which is adjustably secured to the bottom of a transversely-movable slide 76. This slide is guided at right angles to slide 67 by a guide 77, Fig. 8, which is provided with a compensating rail 78. The slide 76 is coupled to the shifting beam 36 by means of a tapped stud 79, depending from the beam and engaging a corresponding eye 80 of the slide, while a screw 81 passes through the lug and a perforated washer 81$^a$. The means for adjustably connecting the rail 75 to slide 76 consist of bolts 82, which pass through curved slots 83 of slide 76 and engage perforations of rail 75. A wedge 84, Fig. 9, adjustably secured within groove 72 of disk 71 and engaging one side of rail 75, compensates for wear. It will be seen that the longitudinal movement of the slide 67 will be transmitted to the disk 71, bolted thereto. The inclined groove 72 of the disk will thus reciprocate along the rail 75, which is bolted to the transversely-movable slide 76. As this slide is by the guides 77 guided at right angles to slide 67, the longitudinal reciprocating movement of the latter will be converted into a transverse reciprocating movement of the former to impart a similar movement of the shifting beam 36. This beam by rib 37 imparts a corresponding motion to the bed-plate 38, and consequently to work-piece A. Thus the latter receives a longitudinal movement and also a lateral movement, which jointly produce the zigzag movement desired. By the adjusting mechanism intermediate the longitudinal slide 67 and the transverse slide 76 the lateral stroke of the bed-plate may be adjusted so as to set the machine to different distances between the perforations to be punched.

The plunger 28 is reciprocated from the power-shaft 27 in the following manner: The shaft 27 is provided with cranks 85, engaging perforated heads of right-hand screws 87. Each screw 87 is tapped into the upper end of a right and left sleeve 88. The lower end of this sleeve is engaged by a left-hand screw 89, having a knuckle 90, which is pivoted to plunger 28 by pintle 91. The sleeve 88 is provided with an integral worm-wheel 92, engaged by a worm 93, hung in bearing 94. By turning the worm the screws 87 and 89 may be caused to approach or recede, so as to change the elevation of plunger 28 and adapt the machine to work-pieces of different thicknesses.

The lower end of plunger 28 carries a punch-holder 95, having a series of upright perforations, each perforation being adapted for the reception of a punch 30. The punch-holder 95 is so secured to the plunger that it may be readily removed and interchanged with other holders having differently-spaced perforations. To this effect one edge of the holder is received by an undercut groove of plunger 28, while its other edge is engaged by a number of set-screws 96.

Figure 19:
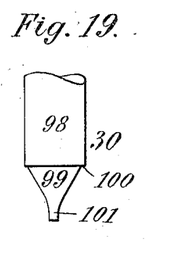
Fig. 19, a detail side view of the lower part of the punch.
Figure 21:
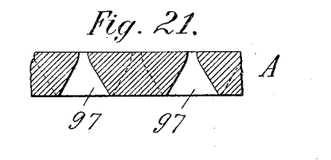

The punch 30 is so shaped as to form a tapering or coniform perforation 97 in plate A. Fig. 21 illustrates these perforations, but shows the plate reversed, so that it occupies the position which it assumes in actual use. The form of the punch is illustrated in Fig. 19. It consists of a cylindrical shank 98, from which depends a conical tip 99, that tapers from top to bottom. A shoulder 100 between shank and the upper widened end of the tip projects laterally beyond the same and flattens any displaced metal on the upper side of plate A. The lower reduced end of tip 99 runs out into a tapering teat or pin 101, which penetrates the work-piece in advance of the conical tip. At the top the shank 98 carries a head 105. Practice has demonstrated that by a punch of the character described a tapering perforation extending through the entire thickness of the work-piece may readily be formed, the displaced metal being crowded into the body of the plate without producing objectionable burs. The dies 102, coöperating with the punches 30, are perforated for the reception of the teats 101 and are supported upon a perforated die-holder 103, which in turn is bolted upon a thrust-plate 104. In order to suspend the punches 30 from the punch-holder 95, the latter is provided with a surface-groove 106, which connects the several upright perforations and is adapted to receive the heads 105 of the punches.

Figure 10:
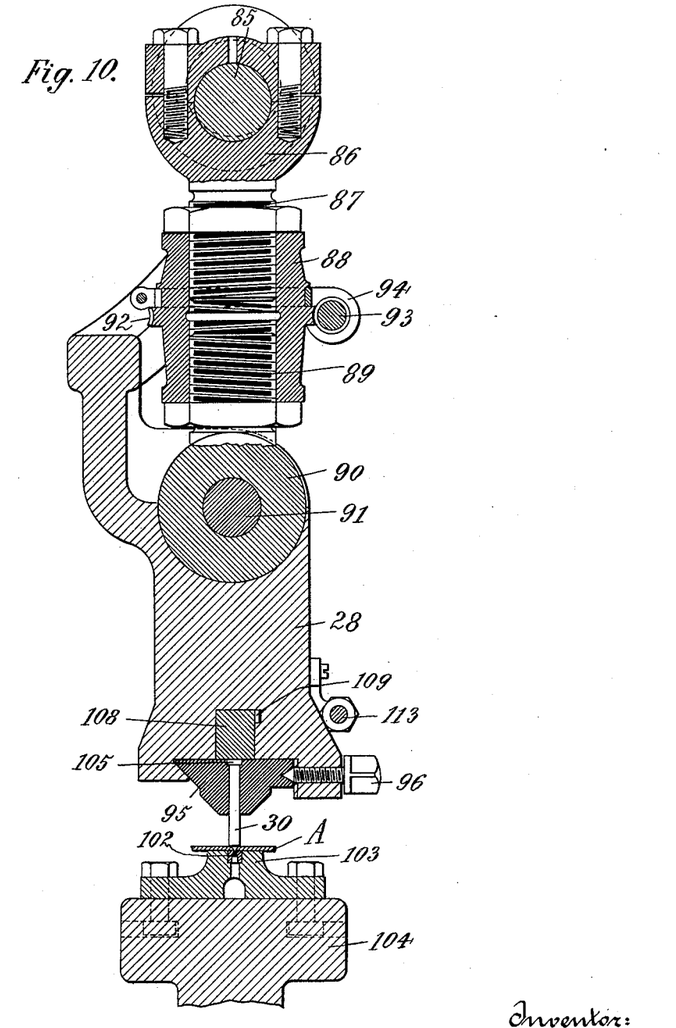
Fig. 10, a detail vertical section through the plunger.
Figure 15:
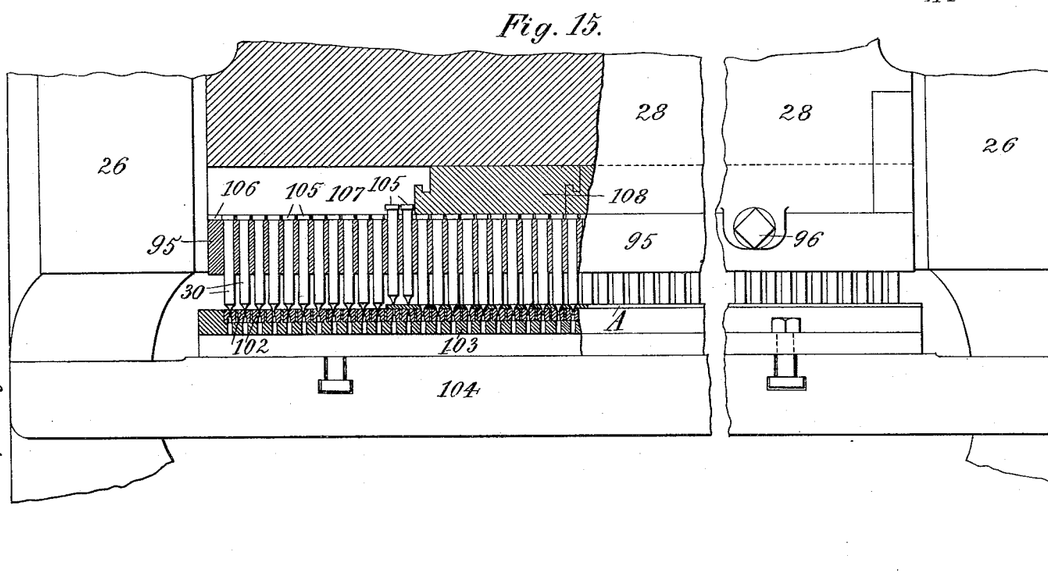
Fig. 15, a vertical section, partly in elevation thereof, with some of the parts omitted.
Figure 16:
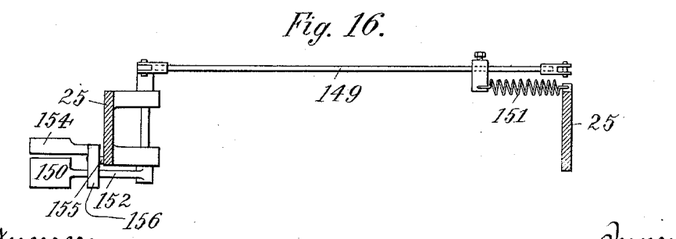
Fig. 16, a detail of the treadles.
Figure 20:
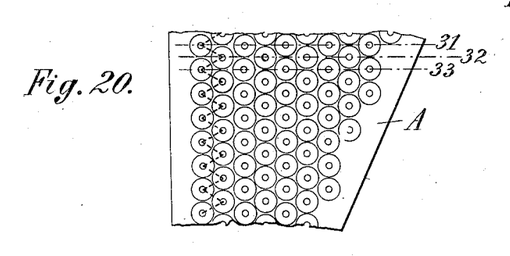
Fig. 20, a plan of portion of a plate perforated by the machine, and Fig. 21 an enlarged cross-section thereof.

As thus far described a descent of the plunger 28 will cause a simultaneous descent of all the punches. It frequently happens, however, that tapering work-plates are to be provided with a uniform solid rim, as shown in Fig. 20, such rim affording means for jointing several plates. For perforating plates of this character it is therefore necessary that the end punches are successively put out of action while punching the successive rows of perforations. In order to obtain the above result, I have devised the following construction: The plunger 28 is provided with a longitudinal groove 107 directly above the punch-holder 95. This groove is adapted to communicate with the surface groove 106 and to permit a vertical displacement of the punches 30. Within the groove 107 is fitted a slidable locking-bar 108, which normally contacts with the heads 105 of punches 30, Figs. 10 and 15, and thus locks the punches to the punch-holder 95. When the locking-bar 108 is, however, withdrawn more or less to clear some of the punches 30, (left-hand side Fig. 15,) the latter on striking the work-piece A will be projected into the groove 107 and will be thus put out of action. The locking-bar 108 is preferably composed of interlocked sections, as shown in Fig. 15, so that as any one section is projected beyond the side of the machine it will become disconnected and drop out.

Figure 14:
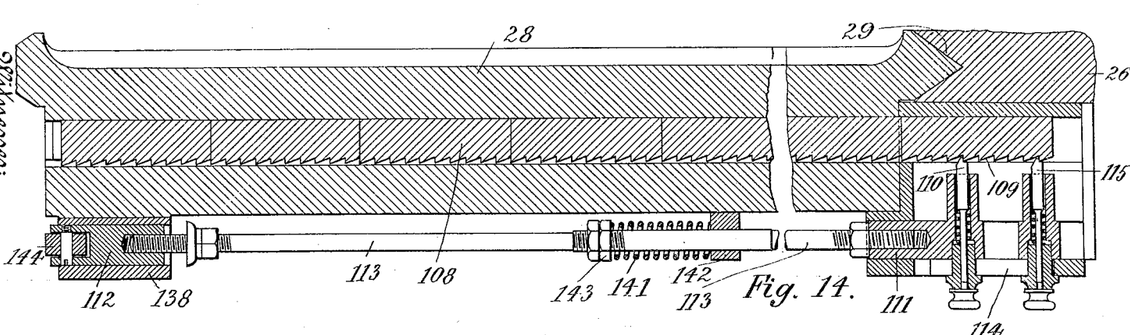
Fig. 14, a horizontal section through the locking-bar and adjoining parts.

The means for operating the locking-bar 108 are as follows: Along one side the bar 108 is provided with teeth to constitute a rack 109. This rack is engaged by a spring-influenced pawl 110 of a rear slide 111, which is connected to a front slide 112 by a rod 113. The rear slide 111 is guided within a slotted casing 114 of frame 25, which also carries a spring-influenced detent 115, engaging rack 109. It will be observed that the parts 111, 113, and 112 collectively constitute one common slide, which upon being moved toward the right, Fig. 14, automatically advances the locking-bar 108 for a corresponding distance by the engagement of the pawl 110 with rack 109. When the slide moves toward the left, the pawl 110 will ride over the rack without taking it along, the latter being locked against displacement by detent 115.

The means for operating the slide are shown to be as follows: Within a grooved guide 116 of standard 26 is free to move vertically a carrier 117, normally depressed by a spring 118. The carrier 117 is provided with a pin 119, passing through an upright slot 120 of guide 116. The pin 119 is by a swivel-coupling 121 connected to a lever 122, having handle 123, and fulcrumed at 124 to guide 116. By depressing handle 123 the carrier will thus be raised, while upon releasing the handle the carrier will be lowered by its spring 118. The upper end of carrier 117 is provided with a horizontal groove that receives a horizontally-adjustable block 125. This block is engaged by a set-screw 126 and is provided with a slot 127 for the reception of a clamp-screw 128, tapped into carrier 117. To the block 125 is hinged by pin 129 the upper end of an inclined rail or abutment 130, the lower end of which is provided with a slot 131 for the reception of a clamp-screw 132, also tapped into carrier 117. The inclination of the abutment 130 may thus be readily adjusted by first slacking the screws 128 132, shifting the block 125, and then tightening up screws 126, 128, and 132.

Figure 11:
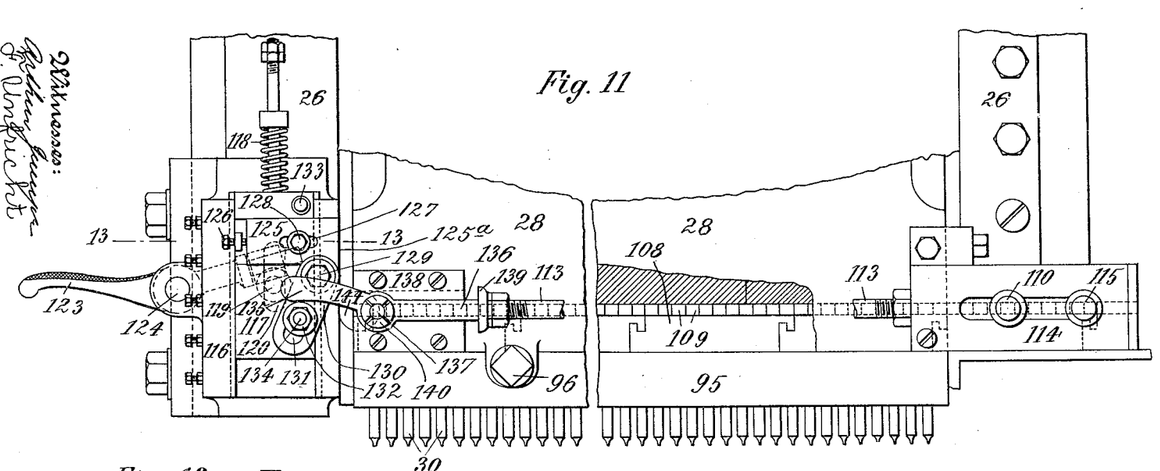
Fig. 11, a detail side view, partly broken away, of the mechanism for operating the punch-locking bar.
Figure 12:
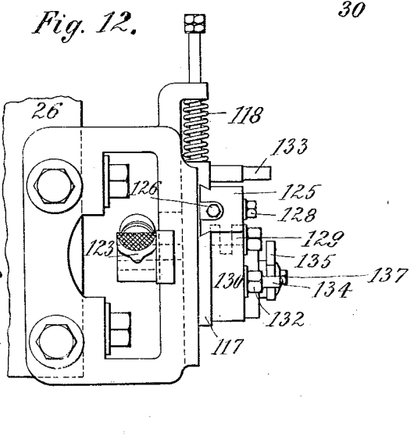
Fig. 12, a front view thereof.
Figure 13:
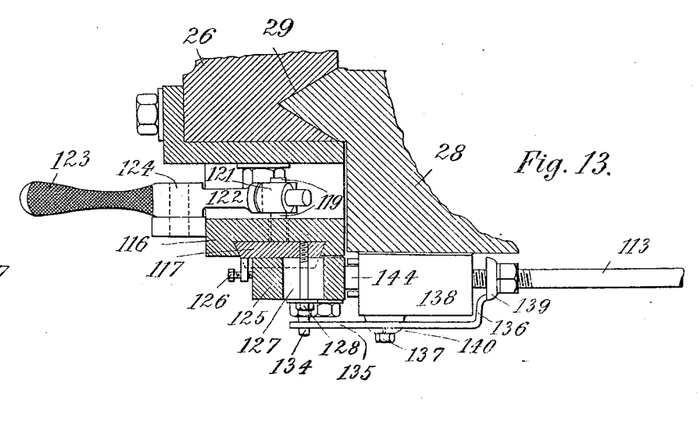
Fig. 13, a horizontal section on line 13 13, Fig. 11.

The upper end of carrier 117 is provided with an upper pin 133, and the clamp-screw 132 is provided with a lower pin 134. Between these pins is arranged the tailpiece 135 of a catch 136, which is fulcrumed at 137 to the guide 138 of the front slide 112. The catch 136 is adapted to engage an adjustable collar 139 of rod 113, Figs. 11 and 13, and is sustained in position by a disk spring 140. A coiled spring 141, encircling rod 113, bears with one end against a fixed bearing 142 and with its other end against a nut 143 of rod 113. The front slide 112 carries a roller 144, adapted to travel normally along the upright face 125$^a$ of block 125 while catch 136 is out of engagement with collar 139.

During the reciprocating operation of the plunger 28 the tailpiece 135 of catch 136 moves freely with it intermediate the stop-pins 133 and 134. When it is desired to shift the locking-bar 108, the handle 123 is depressed to raise carrier 117 and with it the inclined rail 130, so as to carry the latter opposite the path of roller 144. During the descent of plunger 28 the roller 144 will thus be pressed against the inclined rail 130 by spring 141, so as to move the slide 112 113 111 to the left. At the end of the downstroke the tailpiece 135 will strike lower stop 134 to swing the catch 136 in contact with the side of the collar 139. The movement of the slide to the left will cause the pawl 110 to ride over one tooth of rack 109. During the ascent of the plunger the roller 144 in moving along the inclined rail 130 will carry the slide to the right to correspondingly shift the locking-bar 108 by rack 109 for the distance of one tooth and release one of the punches 30. At the end of the upstroke the collar 130 will have been carried so far to the right as to clear the catch 136 and permit the latter to be projected by its own resiliency opposite the left face of the collar. In this way the slide will become locked in its normal position and will prevent a further advance of the rack during the time the handle 123 remains depressed, Fig. 11. Upon a release of the handle the carrier will be lowered by spring 118 to carry the upright face 125$^a$ opposite the path of roller 144. At the end of the upstroke the tailpiece 135 will strike the upper pin 133, so that the catch 136 is again thrown out of engagement with collar 139. Each depression of the handle 123 will thus shift the slide for but the length of a single tooth, and as the length of one tooth should correspond to the distance between the centers of adjoining punches one punch will be liberated at each stroke of the slide. If the machine is to be set for differently-spaced punches, a correspondingly-toothed rack must be used, and the inclination of the rail 130 must be correspondingly altered by means of the slidable block 125.

The power-shaft 27 is adapted to be coupled to the driving-pulley 145 by a clutch 146, operated by shipping-bar 147, bell-crank 148, and rod 149. The rod 149 is operated by a main treadle 150 and is provided with a spring 151, which normally throws the clutch 146 out of engagement with the shaft 27. The shank 152 of treadle 150 is adapted to be engaged by the nose 153 of an auxiliary treadle 154. This second treadle is keyed to an arbor 155 and is weighted or overbalanced, as at 156, so that the nose 153 normally clears shank 152. The machine will continue to run as long as the operator depresses the main treadle, while if the operator removes his foot the machine is promptly arrested. If it is desired to run the machine continuously, the auxiliary treadle 154 is depressed so that its nose will be projected across the shank 152, and thus lock the treadle 150 in its depressed position.

During the operation of the machine the bed-plate 38 is fed underneath the punches and dies. As the supports 40 are clamped to such plate, means should be provided for preventing such supports from being carried against the thrust-plate 104. These means are as follows: Above the bed-plate 30 is arranged in advance of thrust-plate 104 a transverse stop-bar 157, hung in the upper ends of a pair of arms 158, which are fulcrumed to the frame 25 at 159. One of these arms is connected by chain 160, running over pulley 161, and by lever 162 to the arbor 155 of the auxiliary treadle 154. Thus when one of the supports 40 strikes the stop-bar 157 the auxiliary treadle 154 is tilted so that the nose 153 clears the shank 152 of the main treadle 150. The latter is thus released and the clutch will be opened by spring 151 to arrest the machine. The interfering support 40 is now set to a new position away from the thrust-plate 104 and the machine is restarted.

What I claim is—

1. In a gang punching-machine, the combination of a series of punches with a bed-plate adapted to support the work, means for clamping the work to the bed-plate, and means for imparting a zigzag movement to said plate, substantially as specified.

2. In a gang punching-machine, the combination of a grooved bed-plate with a shifting beam engaging the same, means for clamping the work to the bed-plate, means for imparting longitudinal movement to the bed-plate along said beam, and means for imparting lateral movement to the beam, substantially as specified.

3. In a gang punching-machine, the combination of a bed-plate having a rack and a groove, with a pinion engaging the rack, a shifting beam engaging the groove, means for imparting intermittent rotatory motion to the pinion, and means for imparting intermittent lateral movement to the shifting beam, substantially as specified.

4. In a gang punching-machine, the combination of a bed-plate with a shifting beam engaging the same, means for clamping the work to the bed-plate, means for imparting a longitudinal movement to the bed-plate along said beam, a laterally-movable slide connected to the beam, and a longitudinally-movable slide engaging the laterally-movable slide, substantially as specified.

5. In a gang punching-machine, the combination of a longitudinally-movable slide with a grooved disk secured thereto, a laterally-movable slide, a rail on said slide engaging said disk, a shifting beam connected to the laterally-movable slide, and a bed-plate engaged by said beam, substantially as specified.

6. In a gang punching-machine, the combination of a longitudinally-movable slide with a grooved disk, means for adjustably securing said disk to said slide, a rail engaging the disk, a laterally-movable slide, means for adjustably securing the rail to said slide, a shifting beam connected to the laterally-movable slide, and a bed-plate engaged by said beam, substantially as specified.

7. In a gang punching-machine, the combination of a plunger with a perforated punch-holder, punches suspended from said holder, means for locking the punches to said holder, and means for automatically releasing successive punches from said holder, substantially as specified.

8. In a gang punching-machine, the combination of a plunger having a groove with a perforated punch-holder, punches suspended from said holder, a slidable locking-bar within the groove, and means for automatically advancing the locking-bar along the groove to release successive punches, substantially as specified.

9. In a gang punching-machine, the combination of a plunger having a groove with a perforated punch-holder, punches suspended from said holder, a slidable locking-bar engaging the groove and having a rack, a pawl engaging the rack, a slide carrying the pawl, and an inclined abutment adapted to be engaged by the slide, substantially as specified.

10. In a gang punching-machine, the combination of a plunger having a groove with a perforated punch-holder, punches suspended from said holder, a slidable locking-bar engaging the groove and having a rack, a pawl engaging the rack, a slide carrying the pawl, an inclined abutment adapted to be engaged by the slide, and means for adjusting the inclination of said abutment, substantially as specified.

11. In a gang punching-machine, the combination of a plunger having a groove with a perforated punch-holder, punches suspended from said holder, a slidable locking-bar engaging the groove and having a rack, a pawl engaging the rack, a spring-influenced slide carrying the pawl, a collar on the slide, a catch engaging the collar, and an inclined abutment adapted to engage the slide, substantially as specified.

12. In a gang punching-machine, the combination of a carrier with a block adjustably secured thereto, an inclined abutment, means for connecting the abutment to said carrier and block, pins on the carrier, a catch adapted to be engaged by said pins, a slide engaging the abutment and having a collar which is engaged by the catch, a locking-bar operatively connected to the slide, a grooved plunger engaged by the locking-bar, a perforated punch-holder secured to the plunger, and punches suspended from said holder, substantially as specified.

13. In a gang punching-machine, the combination of a bed-plate, with supports adjustably secured thereto, a stop-bar extending across said plate, an auxiliary treadle connected to said stop-bar, a main treadle adapted to be engaged by the auxiliary treadle, a clutch, a shipping-bar for operating the clutch, and means for connecting said bar to the main treadle, substantially as specified.

14. In a gang punching-machine, the combination of a reciprocating plunger with a perforated punch-holder, punches suspended therefrom, means for locking the punches to said holder, means for successively releasing the punches from said holder, a bed-plate, means for imparting a zigzag movement to said plate, and means for clamping the work to the bed-plate, substantially as specified.

Signed by me at New York city, (Manhattan,) New York, this 7th day of April, 1904.

ADOLPH G. HUPFEL.

Witnesses:
WILLIAM SCHULZ,
FRANK V. BRIESEN.